July 28, 1959 M. B. WIDESS 2,897,476
SEISMIC SIGNAL-TO-NOISE RATIO
Filed Oct. 5, 1955 2 Sheets-Sheet 1
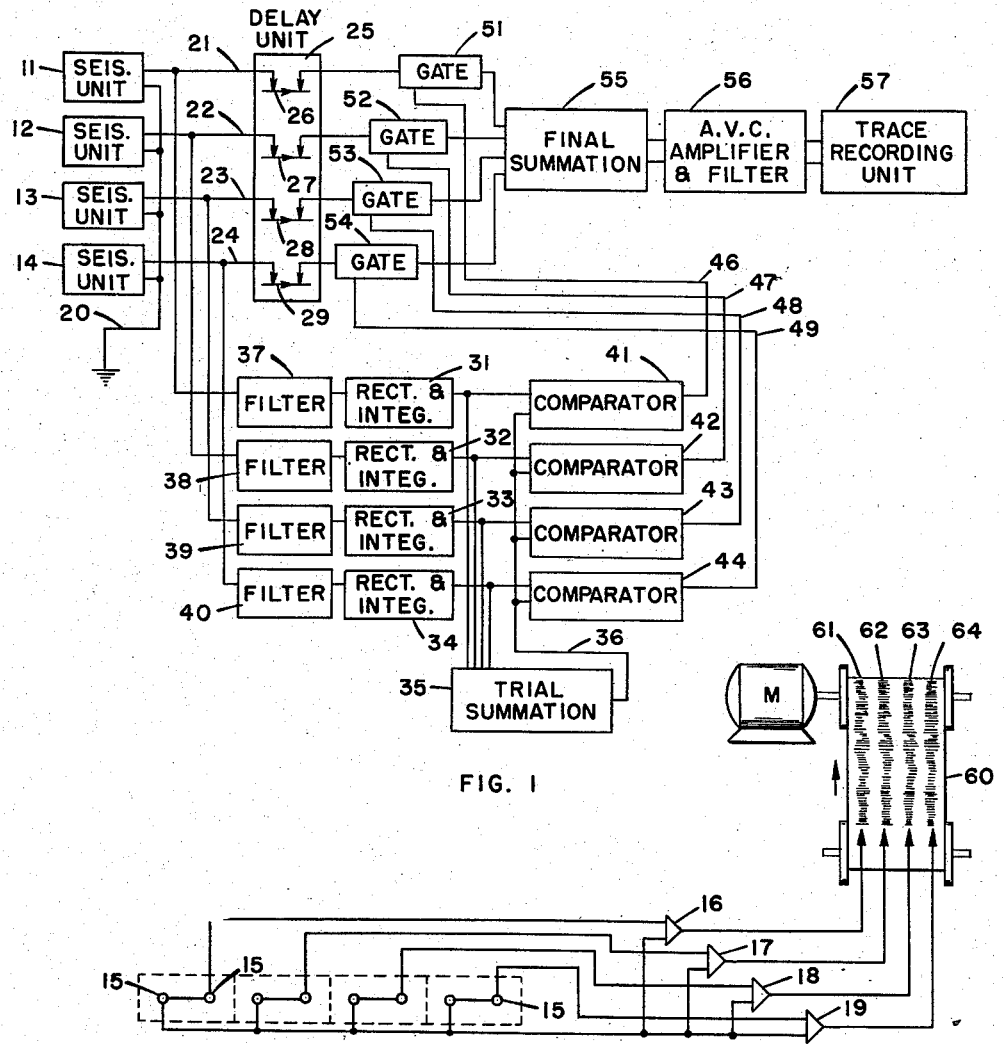
FIG. 1
FIG. 2
FIG. 3
*INVENTOR:*
MOSES B. WIDESS
BY 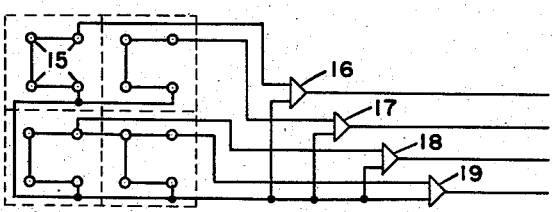
*ATTORNEY*

July 28, 1959

M. B. WIDESS 2,897,476

SEISMIC SIGNAL-TO-NOISE RATIO

Filed Oct. 5, 1955

INVENTOR:
MOSES B. WIDESS
BY Newell Pottoff
ATTORNEY

2,897,476
SEISMIC SIGNAL-TO-NOISE RATIO

Moses B. Widess, Tulsa, Okla., assignor to Pan American Petroleum Corporation, a corporation of Delaware Application October 5, 1955, Serial No. 538,721

6 Claims. (Cl. 340—15)

This invention relates to seismic geophysical surveying and is directed particularly to improving the seismic signal-to-noise ratio in areas of poor results, sometimes termed "difficult" or "problem" areas. More specifically, the invention is directed to systems wherein multiple seismometer outputs are combined to improve signal strength by addition and relatively reduce noise by at least partial self-cancellation.

The use of seismometers and shot holes in multiple-unit patterns to improve signal-to-noise ratio in areas where the signal tends to be considerably smaller than the noise, has been recognized as beneficial for many years. More recently, the numbers of seismometers and of shot points used in multiple-unit patterns have sometimes been very large in efforts to build up a small signal in the presence of very large noise. In some problem areas even these elaborate expedients, however, have sometimes failed to provide usable records. It is in this last situation that the present invention is designed to be useful.

Thus, it should be clearly understood that this invention is not applicable to areas where good seismic surveying results are obtained in other ways. In fact, use of the invention might be detrimental in areas where the seismic signals stand out clearly above the noise background. In other words, the invention is not directed to improving the strength of good signals so much as to improving the elimination of noise so that signals which would otherwise be completely obscured may become recognizable.

The usual method of employing multiple seismometers is simply to combine or sum the outputs of all of the seismometers of each group in the seismometer spread. Another way sometimes employed is to utilize two or more side-by-side spreads separately recorded and subsequently select by visual inspection the best spread or best seismometer groups of the two spreads, showing the highest signal-to-noise ratio. However, in this case also, the seismometers of each group in each spread are ordinarily added together indiscriminately.

From tests showing the form of the outputs of individual seismometers in a group before summation, in areas where noise is troublesome, I have observed that the noise frequently has two important distinguishing characteristics. It is often very large in amplitude, and it is often observable at any instant over a relatively small area of the ground surface. Frequently these small areas are considerably smaller than the nominal area covered by a seismometer group from which the outputs are summed to obtain increased signal amplitudes. Besides these two characteristics of large amplitude and small area of effect, the objectionable noise waves sometimes also exhibit the further characteristic of being substantially lower in frequency than the desired seismic signals, as well as extending over a somewhat greater length of time on the seismic record.

In view of the foregoing, it is a primary object of my invention to provide a novel method and apparatus for discriminating against unwanted noise waves on the basis of these particular characteristics. A more specific object is to provide a novel method and apparatus, in the use of multiple seismometers, wherein noise waves are discriminated against most strongly on the basis of their greater amplitude and smaller area of effect at the ground surface than is true of signals. A still further object is to provide such a novel method and apparatus wherein not only amplitude and area of effect on the ground surface are considered, but also the fact that the noise waves are of lower frequency and longer time duration than desired seismic signals. Other and further objects, uses, and advantages of the invention will become apparent as the description proceeds.

Stated most briefly, the foregoing objects are accomplished in my invention simply by omitting from the voltages included in a summation the outputs of particular seismometer units of a seismometer group which are affected by large-amplitude noise during each time interval that the noise is being received. This function is accomplished by a novel method and apparatus wherein the outputs of the various seismometer units are separately scanned before being included in a summation circuit for final recording, and any individual seismometer-unit responses which are found by the preliminary scanning to be affected by noise are rejected from the summation. The formation of the final summation is preferably delayed while this scanning process takes place.

According to one embodiment of the invention, all of the separate seismometer outputs which are normally brought together into one summation signal in the conventional way are first brought together into a trial summation voltage which is averaged over a short period of time to provide an average value as a basis of comparison. Against this average value, used as a standard of comparison, are compared the individual responses of the various seismometer units similarly averaged over a short period of time. The results of these separate comparisons are then utilized for determining whether or not the various individual seismometer-unit outputs, delayed for the purpose of carrying out these comparisons, are transmitted to the final summation circuit for combination and subsequent recording as one seismic trace. According to a further embodiment of the invention, not only the amplitude but also the frequency of the waves is considered in making comparison voltages in determining the acceptance or rejection of the various individual seismic-unit outputs for use in the final summation.

This will be better understood by reference to the accompanying drawings forming a part of this application and showing in some detail typical embodiments of the invention. In these drawings, Figure 1 is a block circuit diagram of an embodiment of the invention;

Figure 2 is a diagrammatic plan view showing one way of applying the invention to linear spreads;

Figure 3 is a diagrammatic illustration similar to Figure 2 showing application of the invention to areal spreads.

Figure 4:
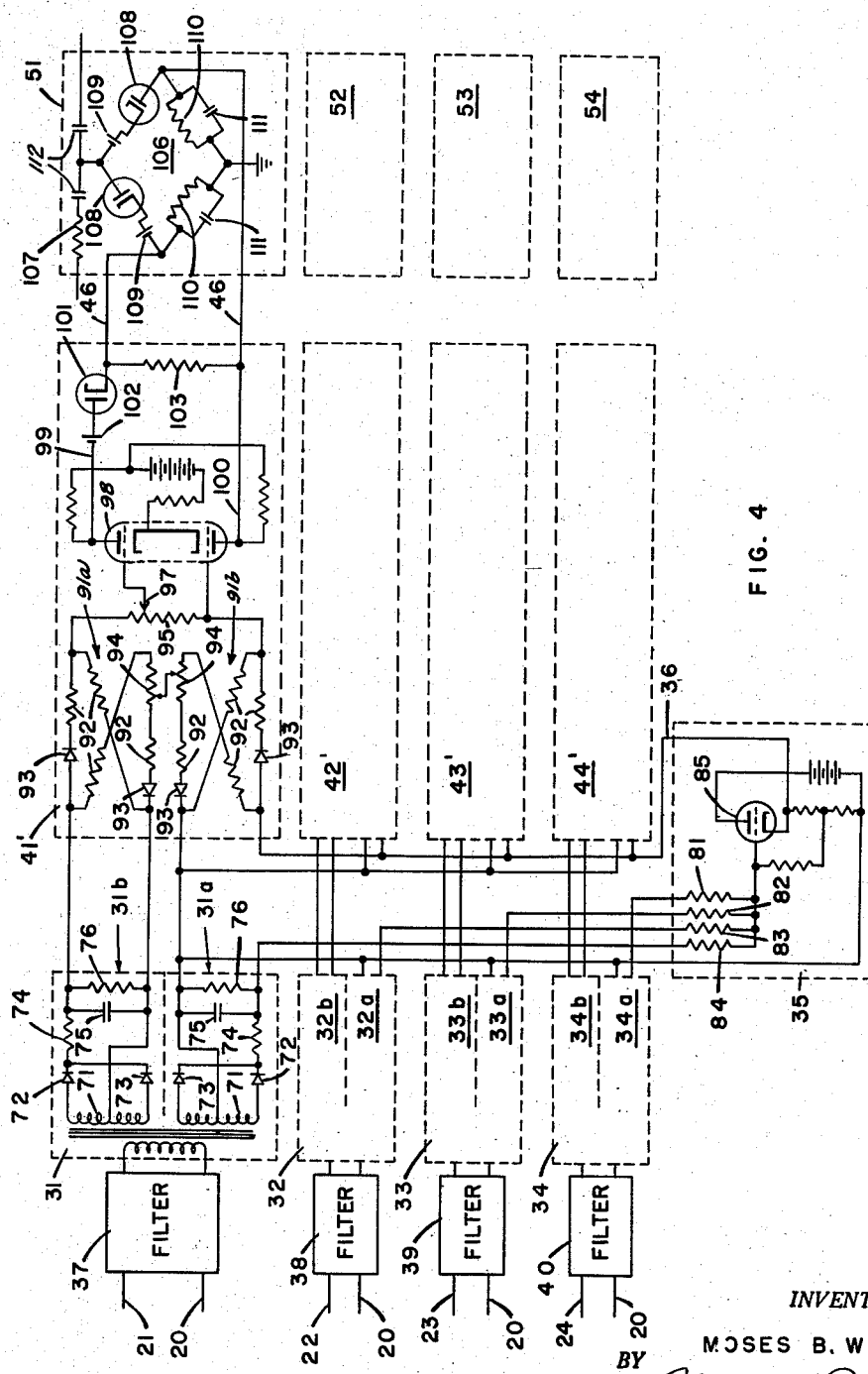
Figure 4 is a detailed circuit diagram of a portion of the embodiment shown in block diagram form in Figure 1.

Referring now to these drawings in detail, Figure 1 shows in block diagrammatic form an embodiment of the invention wherein four seismometer outputs are summed to form a single resultant trace. The choice of four seismometer units for summation will be understood as being illustrative only, as many more than four such units are normally combined when seismometers are being used in large numbers for signal addition and noise cancellation. Also, the terms "sum" and "summation" as used in this description should be understood in the broader sense of "combination," as any of a wide variety of series, parallel, or series-parallel connections of individual seismometer units can be employed to obtain the desired results of noise cancellation and signal reinforcement.

Thus, the four signal-plus-noise outputs of four seismometers 11, 12, 13, and 14, appear on a common lead 20 and on the respectively separate leads 21, 22, 23, and 24. In the usual seismic recording practice, the leads 21-24 extend directly to a summation circuit 55 wherein all of the seismometer-unit outputs are indiscriminately combined to produce a single signal, which is then amplified by a channel amplifier 56, which may include conventional adjustable filters as well as trace-mixing circuits, before finally being applied to a trace-recording unit 57, such as an oscillograph galvanometer.

In accordance with this invention, however, the various seismometer-unit outputs are brought separately to the recording system and are given a preliminary scanning to determine whether all are suitable for inclusion in the final summation made by circuit 55, or whether there are some which are unsuitable and should be rejected. Thus, output leads 21-24 extend to a delay unit 25 wherein the individual delay elements 26, 27, 28, and 29 respectively receive the outputs of the seismometer units, store them temporarily, and then after a short time interval transmit them to the respective gate circuits 51, 52, 53, and 54, which determine whether or not any particular individual output is transmitted to or excluded from the final summation circuit 55.

As the delay unit 25 may take any of a variety of forms well known in the art, it will not be described in detail. It is believed sufficient to state that one convenient form for this device may comprise an array of magnetic recording and reproducing heads for simultaneously recording and picking up traces from a moving magnetic medium such as a magnetic tape, disc, or drum, with the recording and pick-up heads for any trace separated in space such that the travel time of the magnetic medium between them is the desired delay time.

The gate circuits 51-54 may be either normally open or normally closed. For the purposes of this description, it may be assumed that these gate circuits are normally open, and the circuits for developing appropriate gate-closing voltages upon the occurrence of large-amplitude noise will be described. Each of the four signal-carrying leads 21-24 extends respectively to one of four filter circuits 37, 38, 39, and 40, and thence to one of four rectifying and integrating circuits 31, 32, 33, and 34. It is the function of each of these latter circuits to produce an electrical output which varies approximately in proportion to the instantaneous value of the individual input-wave amplitude, averaged over an immediately preceding time interval. This interval is at least as long as, and preferably somewhat longer than, the period of the waves being averaged. It may be, for example, from 50 to 150 milliseconds in length.

This amplitude-averaging function is performed in these circuits by converting each of the four individual signals from an alternating to a pulsating direct-current voltage by rectification, and then continuously integrating or averaging the rectified pulses over a time interval proportional in length to the time constant of a resistance-capacity network. The output of each such averaging or integrating network is then utilized in two ways. All of the outputs are brought together in a trial summation circuit 35 to produce on the output lead 36 of that circuit a varying voltage which is representative of the wave amplitudes averaged both over a period of time and over all of the seismometer units of a seismometer group. Each integrating network output is also transmitted to one of four comparator circuits 41, 42, 43, and 44, where it is compared with the time-averaged overall group amplitude voltage appearing on lead 36. As a result of the comparison carried out in each of these four comparator circuits, a gate-controlling voltage appears on a corresponding one of the comparator output leads 46, 47, 48, and 49, which are respectively connected to the gate circuits 51-54. This gate-controlling voltage changes according to whether the magnitude of the output from any one or more of averaging circuits 31-34 does or does not exceed, by a certain predetermined factor, the magnitude of the comparison voltage on lead 36.

As an example of the operation of the invention, let it be assumed that during a given short interval of time the output of each of the three seismometer units 11, 12, and 13 is of a "normal" amplitude equal to 1.0 millivolt, while the amplitude of unit 14 is twice this amount, or 2.0 millivolts, due to disturbance by large-amplitude noise waves over this period of time. In the absence of such noise, the normally-open gate circuits 51-54 will transmit all of the seismometer-unit outputs to the summation circuit 55. During the time interval that the noise is present on the output of unit 14, however, the output of integrating circuit 34 is twice as large as the output of any of integrating circuits 31, 32, and 33. The combining and averaging of these outputs in summation circuit 35 results in an overall average signal appearing on the lead 36 having a relative magnitude of 1.25 millivolts. In comparators 41, 42, and 43, this is compared with individual signal magnitudes of 1.0 millivolt. As the result of these comparisons, no gate-closing voltages appear on output leads 46, 47, and 48.

By contrast, the voltages compared in circuit 44 have an entirely different relation. The averaged individual output magnitude of circuit 34 is 2.0 millivolts, compared with the overall average of 1.25 millivolts on lead 36. Thus, it is apparent that the individual output magnitude of circuit 34 exceeds the magnitude of the voltage on lead 36 by a much larger factor than did the outputs of circuits 31, 32, and 33. The result of this comparison is that there appears on comparator output lead 49 a gate-closing voltage which operates gate circuit 54 and prevents the output of seismometer unit 14 from being transmitted to summation circuit 55.

This gate-closing voltage continues to be effective as long as the output of circuit 34 exceeds, by more than the predetermined adjustable factor, the comparison voltage on lead 36. The amount of delay interposed by the delay element 29 is just sufficient to compensate for the time required for determining the average signal amplitude in circuit 34. In other words, the gate 54 closes just at the beginning of the retransmission of the large-amplitude wave by delay element 29, this being the time interval required for the output of integrating circuit 34 to build up to the gate-closing level.

It will be apparent that, if large-amplitude signals simultaneously appear on all of the four seismometer units, the comparison voltage on lead 36 similarly increases in magnitude, so that the outputs of comparison circuits 41-44 develop no gate-closing voltages. Likewise, if large-amplitude noise simultaneously appears on all of the seismometer units, the gates 51-54 all remain open, but in that event there are substantial noise-cancelling effects in the summation circuit 55. The circuits of the invention are thus primarily effective only when a large-amplitude noise appears on part of the seismometer units whose outputs are being combined for recording as a single trace.

Two distinct modes of operation, or what may be considered two different embodiments of the invention, appear upon considering the characteristics of filters 37-40. If these filters have the same characteristics as the filter in the channel amplifier 56, then the gate-controlling voltages depend only on the presence or absence of large-amplitude noise within the band of frequencies being recorded by unit 57. The discrimination of the overall system against noise is thus one which considers only the amplitude of the noise.

If the range of frequencies passed by filters 37-40 is different from that passing through the filter of amplifier 56, however, then the gate-controlling voltages depend not only on the presence of large-amplitude noise on part of the seismometer units, but also require that this noise lie within the pass band of the filters 37–40. If these filters are low-pass filters, for example, passing frequencies below the band passed by the amplifier in filter 56, which is true of so-called ground-roll waves at many locations, then these large-amplitude, low-frequency waves are prevented from reaching the input of amplifier 56 where their presence could seriously interfere with the detection of desired higher frequency waves, in spite of the fact that they would be considerably reduced in amplitude by the filters in amplifier 56. For example, use of the invention may aid considerably in preventing overloading of the amplifier 56.

So far, nothing has been specified concerning the nature of the individual seismometer units. The seismometer unit 11, for example, ideally might be an individual senismometer, but when large numbers of seismometers are being combined to form a single group for summation, it is preferable that each seismometer unit comprise two or more seismometers forming a sub-group, with several such sub-groups being combined to form the usual large group. Thus, as in Figure 2, a group consisting of eight individual seismometers 15 set along a line may be divided into four sub-groups of two seismometers each. Each sub-group of two seismometers is assumed to represent the seismic waves received within one of the small dotted line rectangles of Figure 2, and each such sub-group thus corresponds to one of the units 11–14 of Figure 1.

Figure 2 shows also a particularly advantageous way of practicing the invention, wherein each of the seismometer sub-groups is connected to one of four amplifiers 16, 17, 18, or 19, which records on a magnetic tape 60 one of the respective traces 61, 62, 63, or 64. This recording is done during the initial field operations. Subsequently the tape 60 is utilized in the delay unit 25 to provide both an initial signal and a delayed signal, by having two pick-ups scanning each trace, separated from each other at such a distance that the travel time of any given point on the tape from one pick-up head to the next is the exact delay time desired for the trial summation system of Figure 1.

In a similar way, Figure 3 shows the manner of utilizing the invention for recording multiple seismometers spaced apart in an areal group rather than a linear group as in Figure 2. Thus the sixteen seismometers 15, uniformly spaced apart in four rows of four seismometers each to form a square pattern, may be divided into four sub-groups comprising four seismometers each. The output of each sub-group accordingly is representative of the seismic waves being received within each small dotted-line square of Figure 3. All of the four seismometers within each sub-group are connected together and to one of the amplifiers 16, 17, 18, or 19. The outputs of the sixteen seismometers are thus scanned four at a time for determination of the presence of noise which may be the basis for excluding any sub-group output from the final summation as explained in Figure 1. By the use of sub-groups of more than one seismometer in the manner described, a correspondingly larger total number of seismometers can be used for a given outlay of recording equipment.

In Figure 4 is shown a detailed diagram of typical circuits for performing the averaging, comparison, and gate-circuit functions discussed in connection with Figure 1. Thus, the signal-carrying leads 20 and 21 extend to the filter 37 and thence to the primary of a transformer having at least two similar center-tapped secondary windings 71. The rectifying and integrating unit 31 preferably comprises two similar units 31a and 31b, each including one of the center-tapped secondary windings 71 with its terminals connected through rectifying units 72 and 73 to an integrating circuit consisting of a series resistor 74 and a shunt condenser 75, across which is connected a load resistor 76. The voltage appearing across resistor 76 accordingly is a smoothed direct-current voltage varying in amplitude with the amplitude of the alternating-current voltage appearing across winding 71, averaged over a time interval that is proportional to the time constant of the circuit that is composed of resistor 74 and condenser 75.

The summation circuit 35 preferably includes four resistors 81, 82, 83, and 84, each connected to one of the load resistors 76 of the respective integrating circuits 31a–34a. The resistors 81–84 are connected together and to the grid of a vacuum tube 85, which is connected in a cathode-follower circuit that has a high input impedance and a low output impedance for the signal appearing on the output lead 36. This circuit effectively sums the separate voltages appearing across the various load resistors 76 of the four integrating circuits 31a–34a.

Shown within the dotted line 41' is the comparator circuit 41 for producing an output voltage varying with the relative amplitudes of the averaged individual voltage appearing across load resistor 76 of integrator 31b and the averaged signal level appearing across the summation circuit output lead 36. This unit 41 comprises two similar bridge circuits connected in opposition. Each bridge is composed of four resistance arms 92, two opposite arms also including copper-oxide rectifying units 93. All of the bridge-arm resistors 92 preferably have about the same value, and initial balance of the bridge is established by a low-resistance potentiometer 94 at one corner of the bridge. Each of the two bridges 91a and 91b separately produces an output current proportional to the logarithm of the input voltage over a substantial range of voltage variation. These circuits have been described in several places, for example, on page 135 of Electronics for August 1946.

With the two bridges connected in opposition, the current flowing in load resistor 95 connected across their output terminals is proportional to the difference between the logarithms of the two input voltages. This current is thus proportional to the logarithm of the ratio of the two input voltages. Since both the ratio and its logarithm vary in the same sense, the voltage appearing across resistor 95 is practically independent of the absolute magnitudes of the input voltages over a wide range of such magnitudes, but depends only upon their ratio.

Some fraction of this voltage, as determined by the setting of a slider 97 contacting load resistor 95, is applied to the grids of a dual triode tube connected in a differential amplifier circuit, to produce on the output leads 99 and 100 of this circuit a voltage proportional to the logarithm of the ratio. The output of the differential amplifier is applied to a circuit comprising a diode 101, a bias voltage source 102, and a resistor 103 in series. Due to the presence of bias source 102, the current through diode 101 is in a cut-off condition until the bias of source 102 is exceeded by the differential amplifier output, whereupon the resistance of diode 101 drops to a low value, and current flows through resistor 103. The voltage developed by this current flow is the control voltage applied over the leads 46 to the gate circuit 51.

This gate circuit 51 may conveniently take the form of a diode attenuator bridge 106. This attenuator comprises a series resistance 107 in the main signal channel between the delay element 26 and the summation circuit 55, with the bridge 106 forming a shunt resistance across this channel. As is explained in U.S. Patent 2,663,002, the bridge 106 is a very efficient gain-controlling attenuator unit. In this application of the gain control, however, its desired function is to pass from a very high to a very low value of attenuation and vice versa rather than to operate as a continuously variable attenuator as described in the patent.

In this diode bridge, one branch comprises the two diodes 108 and bias voltages 109 connected in series, while the other branch comprises a resistor 110 and a condenser 111 connected in parallel in each of the two arms. With blocking condensers present in the signal lead, the control voltage applied over the leads 46 to the control terminals of this diode bridge determines its effective value as a shunt resistor. Thus, its action when a noise voltage is to be omitted from the final summation circuit 55 is to drop to a very low value of effective resistance, so that the noise voltage is effectively shunted out of the summation circuit. On the other hand, when the output of bridge 91b drops below that of 91a by a certain ratio, corresponding to a signal smaller than the overall average value or only exceeding this value by something less than a given amount, the voltage across resistor 103 is zero, and the bias of sources 109 acts to make the effective resistance of bridge 106 high compared to that of series resistor 107. Accordingly, the signal from delay element 26 is transmitted to final summation circuit 55 with relatively small attenuation.

In operation, it will be seen that the setting of slider 97 on load resistor 95 determines the point at which noise-voltage cut-off begins to occur, while the amplitude of an individual trace due to noise is increasing relative to the averaged overall amplitudes. Moving slider 97 upward lowers the voltage ratio where cut-off of individual noise voltages begins, whereas lowering the slider requires that the ratio of noise to overall average voltage become substantially larger before cut-off begins.

Another feature of the invention resides in the fact that condensers 111 and resistors 110 in part regulate the speed of operation of the gate circuit 51. By proper choice of the size of these resistors and condensers relative to the charging current available to them over the leads 46, the rate at which cut-off and reconnection of the signal channel to summation circuit 55 take place can be regulated as desired. In this regard, there are two possible choices. The action of the gate 51 may be made so rapid that any transient voltage due to the switching action tends to be filtered out by the high frequency cut-off of the band-pass filters in amplifier 56. Alternatively, the action can be made to take place so gradually that it is below the effective frequency range of the filters in amplifier 56, and thus what might otherwise be recorded as a variation in trace amplitude by the recording unit 57 can be compensated at least in some degree by the automatic volume control action of amplifier 56. It is believed that this latter type of action is preferable to the effect produced by the high-frequency transients of a rapid switching action in the gate circuit 51, since the action of the automatic volume control circuits of amplifier 56 may be adversely affected by the very sudden changes in signal level if several seismometer outputs are cut into or out of summation circuit 55 almost simultaneously.

In the foregoing description and in the claims below, the term "amplitude," with reference to a property of seismic signal and noise waves, has been used in a general sense meaning "magnitude" rather than in an exact technical sense. That is, no attempt has been made to specify whether the "amplitude" measured by circuits 31–34 is a peak, root-mean-square, effective, rectified, or some other kind of amplitude, except that it is not the instantaneous amplitude. For continuous waves of one or a few discrete frequencies such terms have more significance than they do for impulsive, complex seismic wave forms.

It is likely that the outputs of circuits 31–34 more closely resemble root-mean-square amplitudes than some other kinds, but this fact is of minor importance. Whether one of a large number of seismometer units being combined is included or excluded from the summation when its output magnitude is close to the cut-off limit is relatively unimportant. What is important is that it shall be definitely excluded when its magnitude is much larger than the critical value. This is primarily what the circuits described are designed to do.

While I have thus described my invention in terms of the foregoing embodiments and specific details thereof, it is to be understood that other and further modifications may occur to those skilled in the art. The scope of the invention therefore should not be considered as limited to the embodiments and specific details set forth, but it is properly to be ascertained by reference to the appended claims.

I claim:

1. Apparatus for seismic geophysical surveying comprising, in combination, means for producing a plurality of seismic signals, each corresponding to the seismic waves received by a seismometer sub-group forming part of a seismometer group which is normally combined for recording as a single trace, a plurality of delay and reproducing means each adapted to reproduce one of said signals after a time delay, a plurality of gating means each adapted to control the transmission of signals to a summation circuit by one of said reproducing means, a plurality of filters each connected to one of said signal-producing means, a plurality of amplitude-responsive means each connected to one of said filters and adapted to produce an electrical output proportional to the magnitude of the corresponding filter output averaged over a time interval about equal in length to said time delay, means for producing an electrical comparison voltage proportional to the average value of the outputs of all of said amplitude-responsive means, a plurality of comparator means each connected to one of said amplitude-responsive means and to said comparison voltage producing means, each of said comparator means being adapted to produce an electrical control signal which changes sharply whenever the ratio of the corresponding amplitude-responsive means output to said comparison voltage exceeds a predetermined value, each of said comparators being connected to a corresponding one of said gating means, and said control signal being adapted to act on said gating means to prevent transmission to said summation circuit of large-amplitude seismic signals received from a given sub-group but not present on all of the sub-groups forming said seismometer group.

2. Apparatus as in claim 1 in which the range of frequencies passed by said filters is about the same as the range of frequencies to be recorded.

3. Apparatus as in claim 1 in which the range of frequencies passed by said filters is substantially different from the range of frequencies to be recorded.

4. Apparatus as in claim 1 in which each of said amplitude-responsive means comprises means for rectifying the received signals and an integrator for the output of said rectifying means having a time constant about equal to said time interval.

5. Apparatus as in claim 1 in which each of said comparator means includes an adjustment means for adjusting the value of said ratio at which said control signal changes sharply.

6. Apparatus as in claim 1 in which said seismometer sub-group includes at least two adjacent seismometers but forms a relatively small fraction of the total number of seismometers forming said group.

References Cited in the file of this patent

UNITED STATES PATENTS 2,619,587     Trevor  ---------------- Nov. 25, 1952
2,652,555     Smith  ----------------- Sept. 15, 1953